US012596962B2

(12) United States Patent
Folkesson et al.

(10) Patent No.: US 12,596,962 B2
(45) Date of Patent: Apr. 7, 2026

(54) DATA TRANSMISSION USING DATA PRIORITIZATION

(71) Applicant: Telefonaktiebolaget LM Ericsson (publ), Stockholm (SE)

(72) Inventors: Mats Folkesson, Täby (SE); Bin Sun, Luleå (SE); Rafia Inam, Västerås (SE); Elena Fersman, Stockholm (SE); Daniel Lindström, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 772 days.

(21) Appl. No.: 17/760,232

(22) PCT Filed: Feb. 7, 2020

(86) PCT No.: PCT/SE2020/050122
§ 371 (c)(1),
(2) Date: Aug. 5, 2022

(87) PCT Pub. No.: WO2021/158152
PCT Pub. Date: Aug. 12, 2021

(65) Prior Publication Data
US 2023/0075551 A1     Mar. 9, 2023

(51) Int. Cl.
*G06N 20/00* (2019.01)
*G06N 20/20* (2019.01)

(52) U.S. Cl.
CPC ............. *G06N 20/20* (2019.01); *G06N 20/00* (2019.01)

(58) Field of Classification Search
None
See application file for complete search history.

(56) References Cited

U.S. PATENT DOCUMENTS 6,963,870 B2    11/2005   Heckerman
11,640,447 B1 *   5/2023   Stone ..................... G06F 18/24
706/62

(Continued)

FOREIGN PATENT DOCUMENTS

CN         108768876 A    11/2018
CN         109558909 A     4/2019
(Continued)

OTHER PUBLICATIONS

Dongzhu Liu, et al. (Liu) Data-Importance Aware User Scheduling for Communication Efficient Edge Machine Learning, Oct. 5, 2019, Https://arxiv.org/abs/1910.02214 (it's the same as the provided NPL) (Year: 2019).*

(Continued)

*Primary Examiner* — Xuyang Xia
(74) *Attorney, Agent, or Firm* — Rothwell, Figg, Ernst & Manbeck, P.C.

(57)         ABSTRACT

A method for providing data to a destination node connected to one or more source nodes via one or more networks. In one aspect, the method is performed by a feature identifier for selecting at least one feature from a set of features. The set of features comprises a first feature and a second feature. The method includes, for each feature included in the set of features, obtaining a value indicating a cost of providing the data set for the feature from a source node that stores the data set to a destination node that is connected to the source node via a network. The method also includes, based on the obtained values, selecting a subset of the set of features. The method further includes for each selected feature, initiating the transmission of the respective data set for the respective selected feature from a source node to the destination node. The destination node may execute a machine learning pro- (Continued)

cess that is operable to use the respective data sets to produce a model.

13 Claims, 5 Drawing Sheets

(56) References Cited

U.S. PATENT DOCUMENTS

| | | | | |
|---|---|---|---|---|
| 2006/0274663 | A1* | 12/2006 | Brethereau | H04L 41/069 370/247 |
| 2016/0094649 | A1* | 3/2016 | Dornquast | G06F 16/182 709/227 |
| 2017/0149863 | A1* | 5/2017 | Chitti | H04L 47/10 |
| 2018/0365521 | A1* | 12/2018 | Dai | G06F 18/2148 |
| 2019/0156215 | A1 | 5/2019 | Matveev et al. | |
| 2019/0220703 | A1 | 7/2019 | Prakash et al. | |
| 2019/0318270 | A1 | 10/2019 | Duenner et al. | |
| 2021/0073672 | A1* | 3/2021 | Shi | G06N 20/00 |

FOREIGN PATENT DOCUMENTS

| | | |
|---|---|---|
| CN | 110191053 A | 8/2019 |
| CN | 110659740 A | 1/2020 |
| EP | 3 550 469 A2 | 10/2019 |

OTHER PUBLICATIONS

Inagaki et al. "Prioritization of Mobile IoT Data Transmission Based on Data Importance Extracted From Machine Learning Model" (IEEE, IEEE Access, vol. 7, date of publication Jul. 11, 2019, DOI: 10.1109/Access.2019.2928216, Electronic ISSN: 2169-3536) (Year: 2019).*

International Search Report and Written Opinion issued in International Application No. PCT/SE2020/050122 dated Feb. 4, 2021 (14 pages).

Liu, D., et al., "Data-Importance Aware User Scheduling for Communication-Efficient Edge Machine Learning", arXiv:1910.02214v1 [cs.NI], Oct. 5, 2019 (31 pages).

Lyu, X., et al., "Optimal Online Data Partitioning for Geo-Distributed Machine Learning in Edge of Wireless Network", IEEE Journal on Selected Areas in Communications, vol. 37, No. 10, Oct. 2019 (14 pages).

Yu, W. et al., "Research of Datasets Division in Abstract Grid Workflow", Aug. 10, 2013 (4 pages).

Qiao Lan et al., "An Introduction to Communication Efficient Edge Machine Learning", Dec. 2019 (22 pages).

Mona Shah et al., "Prognosis Using Distributed Data Classification with Privacy Preserving: A Novel Approach", IEEE, Dec. 19-21, 2016 (4 pages).

* cited by examiner

100
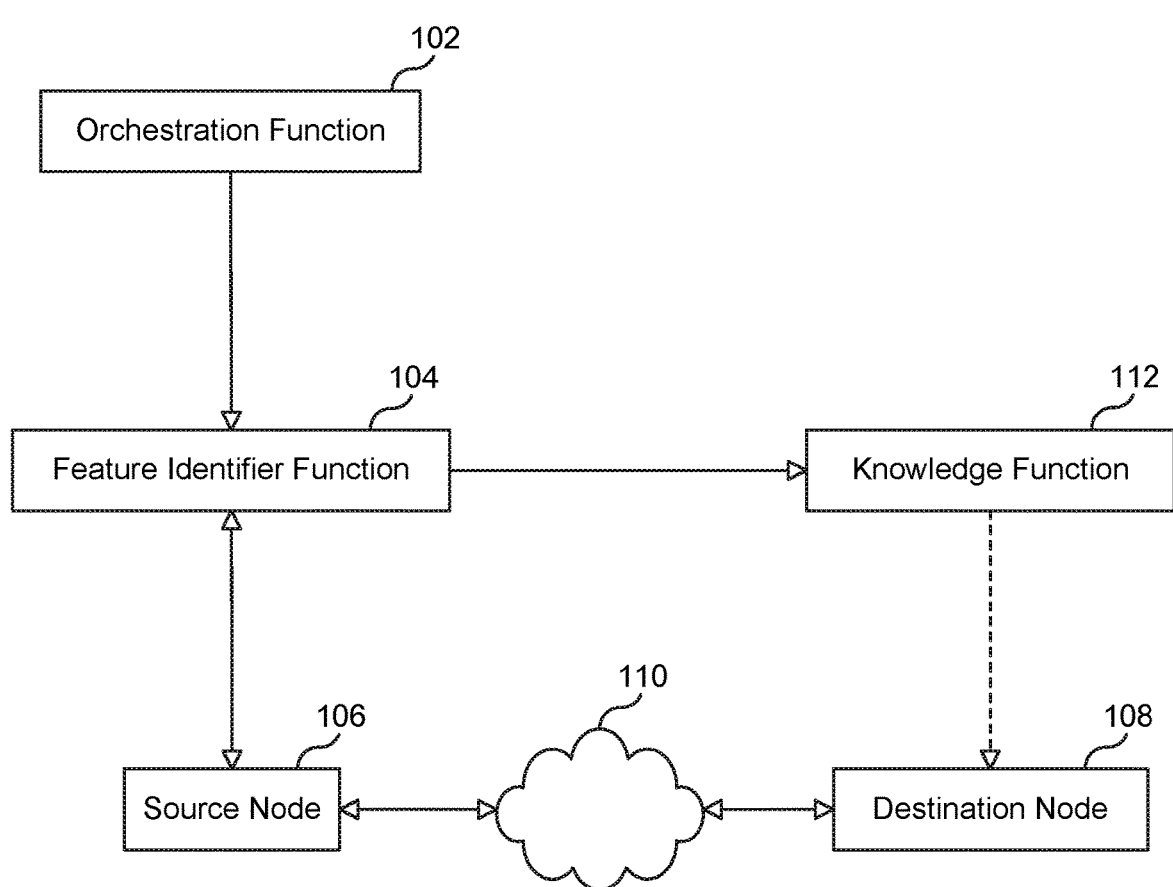
102
Orchestration Function
104
Feature Identifier Function
112
Knowledge Function
110
106
Source Node
108
Destination Node
FIG. 1

300

400

s402

For each feature included in the set of features,
obtaining a value indicating a cost of providing the data set for the feature
from a source node that stores the data set to the destination node
that is connected to the source node via a network s404

Based on the obtained values,
selecting a subset of the set of features s406

For each selected feature, initiating the transmission of the respective data set
for the respective selected feature from the source node that stores
the respective data set for the respective selected feature to the destination
node via the network that connects the destination node with the source node
that stores the respective data set for the respective selected feature

FIG. 4

DATA TRANSMISSION USING DATA PRIORITIZATION

CROSS REFERENCE TO RELATED APPLICATION(S)

This application is a 35 U.S.C. § 371 National Stage of International Patent Application No. PCT/SE2020/050122, filed 2020 Feb. 7.

TECHNICAL FIELD

Disclosed are embodiments related to providing at least one feature data set to a destination node configured to train a machine learning (ML) model using the feature data set and/or configured to generate an inference using a previously trained ML model and the feature data set.

BACKGROUND

Machine learning (ML) is a method of data analysis that automates the creation of an ML model (e.g., function) based on input data (a.k.a., "training" data). ML is a branch of artificial intelligence that is based on the idea that systems can learn from data, identify patterns, and make decisions with reduced human intervention. By repeatedly training an ML model using different training data, the ML model can be improved.

The demand for artificial intelligence has grown significantly over the last decade. However, in order to increase the quality of an ML model, a substantial amount of training data may be required. Although some small ML models can be trained with modest amounts of data, other (e.g. larger) ML models require copious amounts of data. For these ML models that require a large amount of input data, it can be beneficial to distribute the machine learning workload across multiple machines.

SUMMARY

To create an ML model an input data set needs to be provided to a destination node that runs the ML process that uses the input data to create (or "train") the ML model. Similarly, to run an ML model to produce an inference, an input data set needs to be provided to the destination node that runs the ML model. When the destination node is located remotely from the source node that stores the input data set, the input data set needs to be transmitted to the over a network from the source node to the destination node. In many cases the input data may be very large. Accordingly, the transmission of the input data set over the network may take a long time, and thus may slow down the training process or the inference process. Additionally, when the input data set is large, the transmission of the input data set over the network might significantly burden the network.

Thus, according to some embodiments of this disclosure, rather than sending the complete input data set to the destination node, a subset of the input data set is selected and transmitted to the destination node. The input data set is made up of a plurality of feature data sets, wherein each one of the plurality of feature data sets is associated with one particular feature. In one embodiment, each feature is assigned a priority value indicating a priority of the feature and the subset of the input data set is selected based on the assigned priority values such that the subset of the input data set contains at least the feature data set that is associated with the feature having the highest priority. In some embodiments, the priority value for a feature is based on, at least in part, the importance of the feature with respect to the accuracies of the ML model. Prioritizing the transmission of the most important data would speed up the training and/or inference process when the data needs to be transmitted over a network to a destination node, especially when a transport capacity of the network is limited or when ML processing device's processing capacity is limited. For example, the training of the ML model can be started earlier if some of the input data (e.g., a particular feature data set) is available at an earlier time and the time for ML model training can be shorter if less input data (e.g., features) is used.

Typically, not all data (e.g., features) is equally important under different conditions. For example, the variation in annual temperatures is low in Singapore and thus the variation is not a very important feature to transmit over the network for ML model training/inference for use in Singapore. Instead, an average temperature value and transport capacity of a network are more important data (e.g., features).

Accordingly, in one aspect there is a method for providing data to a destination node connected to one or more source nodes via one or more networks. The method may be performed by a feature identifier for selecting at least one feature from a set of features and the set of features may comprise a first feature and a second feature, wherein each feature included in the set of features is associated with a data set for the feature such that the first feature is associated with a first data set and the second feature is associated with a second data set. In one embodiment, the method includes, for each feature included in the set of features, obtaining a value indicating a cost of providing the data set for the feature from a source node that stores the data set to the destination node that is connected to the source node via a network. The method also includes, based on the obtained values, selecting a subset of the set of features. The method further includes, for each selected feature, initiating the transmission of the respective data set for the respective selected feature from the source node that stores the respective data set for the respective selected feature to the destination node via the network that connects the destination node with the source node that stores the respective data set for the respective selected feature. The destination node may execute a machine learning process that is operable to use the respective data sets to produce a model. Additionally or optionally, the destination node may execute a model generated by a machine learning process, and the model is operable to use the respective data sets to produce an inference.

The embodiments provide at least the following advantages.

With less data to be processed, an ML model will be available for inference within a shorter time. In case the device running an ML model is not very fast and ML model training or inference requires real time data, running a simpler ML model that requires less data can be advantageous.

Also, with less data to be processed, data transformation and/or feature extraction are likely to be performed faster and an ML model itself may also be able to perform inference faster.

ML Model Training—With less data to be processed and transferred, the ML model training time can be shortened.

ML Model Inference—By sending the high priority data first and running an ML model using the high priority data only, the speed of performing an ML model inference may be increased. When the capacity of a network allows more data to be transmitted and/or received, the additional data may be used for the ML training or inference later.

BRIEF DESCRIPTION OF THE DRAWINGS

The accompanying drawings, which are incorporated herein and form part of the specification, illustrate various embodiments.

FIG. 1 illustrates a system according to some embodiments.

FIG. 4 is a flow chart illustrating a process according to some embodiments.

DETAILED DESCRIPTION

Figure 2:
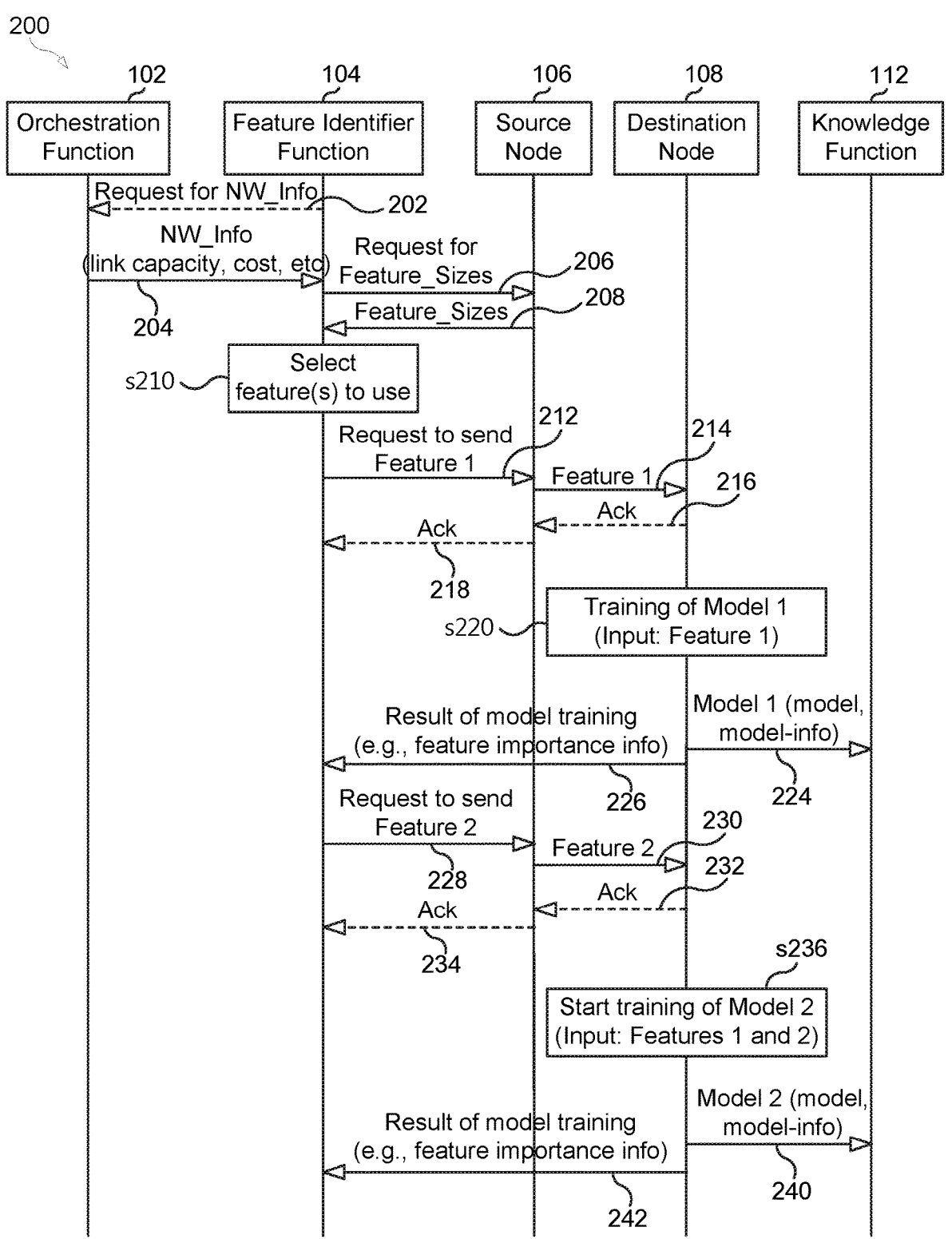
FIG. 2 is a process according to some embodiments.

According to some embodiments of this disclosure, optimized data transmission for ML model training and/or inference can be accomplished by first identifying one or more high priority features and initially transferring to the destination node only the respective feature data sets corresponding to the highest priority features to thereby speed up ML model training and/or inference processes.

In one embodiment, the priority of a feature may be based on the feature's importance—e.g., the amount by which the feature data set for the feature improves the performance of the ML model. For example, in one embodiment, the priority of a feature is based on not only its importance but also the size of the feature data set for the feature. The priority of a feature may also be based on information about the capacity of a network that connects the source node storing the respective feature data set and the destination node performing the ML training or ML inference.

ML model training may be performed iteratively by first using only the highest priority feature data set(s) to create ML model(s). Later, lower priority feature data sets can be used for re-training ML model(s) or for creating more ML model(s) to complement the simpler one (e.g., the ML model that only requires the high priority data). Identification of important features may be performed in various ways. For example, an important feature may be identified by using "feature similarity"—i.e., identifying features which differ and impact the ML model differently. This identification may be performed during initial model development such that the important features are known at the time of re-training the ML model.

A ML model may be one model using parts of or all data (e.g., features), or several different models using parts of or all data.

FIG. 1 illustrates a system 100 for performing a ML process according some embodiments. The ML process may be an ML model training process or an ML model inference process. The system 100 includes an orchestration function 102, a feature identifier function 104, a source node 106, a destination node 108, a network 110 that enables source node 106 to communicate with destination node 108, and a knowledge function 112.

Orchestration function 102 has information about transmission capacity and/or transmission cost of network 110. Orchestration function 102 obtains performance information from different nodes or functions in the network 110 and based on the obtained information, identifies and/or predicts the transmission capacity and/or transmission cost of network 110 at run time.

Feature identifier function 104 is a function for selecting at least one feature and/or ML model to be used based on the importance of the feature, system capabilities (e.g., transmission performance), cost, and/or size of the respective feature data set associated with the feature.

There are various ways to identify the importance of features. Some features may be known to be not important by experts (e.g., temperature of Singapore may not be very important in transmission of data over a network for an ML model training/inference in Singapore). Otherwise, some tree-based algorithms like XGB or Random Forest may be used to automatically identify importance of features.

Source node 106 is a node storing an input data set (or a portion of an input data set). Table 1 below represents an exemplary input data set.

TABLE 1

|   | F1 | F2 | F3 | F4 |
|---|----|----|----|----|
| 1 | V1, 1 | V2, 1 | V3, 1 | V4, 1 |
| 2 | V1, 2 | V2, 2 | V3, 2 | V4, 2 |
| 3 | V1, 3 | V2, 3 | V3, 3 | V4, 3 |
| . | . | . | . | . |
| . | . | . | . | . |
| . | . | . | . | . |
| N | V1, N | V2, N | V3, N | V4, N |

In this example, four features are defined (F1, F2, F3, and F4) and the input data set consists of N data records, where each data record contains one value for each of the four defined features. For example, record 3 contains values V1,3; V2,3; V3,3; and V4,3 corresponding to features F1, F2, F3, and F4, respectively. Accordingly, the input data set contains four feature data sets, one for each of the four features. More specifically, feature data set i (i=1, 2, 3, or 4) contains values Vi,1 to Vi,N. For example, the feature data set for feature F1 contains values V1,1; V1,2, V1,3; . . . ; and V1,N. As used herein a "value" may be scalar value (i.e., single value) or a set of values (e.g., a multi-dimensional vector).

Destination node 108 is a node where ML model training and/or inference take place.

Knowledge function 112 is a function storing all ML models that are produced along with some supplemental information about the models (e.g., the type of feature(s) used for training a particular ML model, the accuracy of the ML model, etc.)

ML Model Training Phase

Step 1—During model development, the most important feature(s) are identified (i.e., the features having the greatest positive impact on model performance). There may be one model or several models (e.g., Model_1, Model_2, . . . , Model_n) each using different features. For example, Model_1 may be trained with the most important feature only while Model_n may be trained with all features.

Step 2—ML models (e.g., Model_1 and Model_2) are defined in a network. The node that trains the ML models (destination node 108) is located remotely from source node 106 that stores the relevant feature data sets.

Step 3—The feature identifier function 104 selects features to be used for ML model training/inference based on system information (e.g., transmission capacity/cost) and the impact of using the features on the performance of an ML model (e.g., features to be used may be prioritized according to feature importance and the size of the feature data set for the feature). For example, an ML training system may begin to transmit and/or receive the feature data set for the most important feature (e.g., Feature 1) to and/or from destination node 108. When the feature data set for the most important feature (e.g., Feature 1) is received at destination node 108, the training of Model_1 (which may be trained with Feature 1 only) may be started. When the training of Model_1 is completed, Model_1 may be deployed and started to be used for inference.

Step 4—After destination node 108 receives the feature data set corresponding to the most important feature (e.g., Feature 1), if the transport capacity of network 110 allows more feature data sets to be transferred, the ML training system may begin to transmit the feature data sets corresponding to the next highest priority feature (e.g., Feature 2) to destination node 108. Then, Model_2 can be trained using all received feature data sets (e.g., the feature data sets of Features 1 and 2). After Model_2 is trained, Model_2 may be deployed and started to be used for inference.

Step 5—After destination node 108 receives the next feature data set (e.g., Feature 2), if the transport capacity of network 110 allows more feature data set to be transferred, more feature(s) may be prioritized and/or more feature data set(s) may be transferred according to importance of feature (s).

ML Model Inference Phase

One or more trained ML models may exist and be stored in knowledge function 112. Among the stored ML models, feature identifier function 104 may select a model and/or a feature to use for ML model inference based on capacity of transmission link, capacity of the model, feature priority, and processing capacity of the ML processing means (e.g., destination node 108). The information regarding the selected model (e.g., Model_1) and the selected feature (e.g., Feature_1) may be provided to destination node 108 such that the inference of the ML model that uses the selected feature may be executed.

If the transport capacity of network 110 increases, more data (e.g., Feature_1 and Feature_2) may be provided to destination node 108. Then inference of the ML model(s) which use said more data (e.g., Feature_1 and Feature_2) may be executed.

The process of selecting an ML model and providing feature(s) corresponding to the selected ML model may be performed automatically in an adaptive way. For example, transport throughput capacity of network 110 may be monitored periodically, and based on the monitored transport throughput capacity, a different ML model may be selected and different feature(s) associated with the different ML model may be provided to destination node 108.

FIG. 2 illustrates an exemplary message flow 200 for optimizing transmission of feature data sets used for ML model training. In the message flow 200, orchestration function 102 may transmit toward feature identifier function 104 network information ("NW_Info") 204. Examples of the network information 204 are network capacity and/or network transmission cost.

The network information 204 may be transmitted toward feature identifier function 104 based on an occurrence of an event. For example, the network information 204 may be transmitted toward feature identifier function 104 as a result of orchestration function 102 receiving from feature identifier function 104 a request 202 for the network information 204.

Feature identifier function 104 transmits toward source node 106 a request 206 for information regarding the sizes of the feature data sets that comprise an input data set ("Feature_Sizes"). In response to the request 206, source node 106 may transmit toward feature identifier function 104 the requested size information 208.

Based on at least one of: the received network information 204, the requested size information 208, and feature importance values, feature identifier function 104 selects at least one feature to use for model training (see step s210). For example, for each feature included in a set of features, feature identifier function 104 may obtain a priority value indicating a priority of the feature, which priority value may be based on a cost of providing the feature data set associated with the feature from source node 106 to destination node 108 and a feature importance value that indicates the importance of the feature (i.e., the feature importance value indicates the impact of the feature on model performance). That is, the priority value may be calculated using the received network information 204, the feature size information 208 (i.e., the amount of data contained in the feature data set for the feature), and feature importance value. For example, the priority value of a particular feature may be proportional to $$\frac{\text{Feature importance value}}{\text{Size} \times \text{Transmission cost}} \text{ or}$$

$$\frac{\text{Feature importance value} \times \text{Network capacity}}{\text{Size}},$$

where Size is the size of the feature data set for the feature and Feature importance value is a value that indicates the importance of the feature. Based on the obtained priority values, feature identifier function 104 selects at least the highest priority feature.

After selecting a feature to use, feature identifier function 104 transmits toward source node 106 a request 212 to transmit the feature data set associated with the selected feature (e.g., "Feature_1"). In response to receiving the request 212, source node 106 may transmit toward destination node 108 the requested feature data set 214. After receiving the feature data set 214, destination node 108 may optionally transmit toward source node 106 an acknowledgement message 216 acknowledging the receipt. Similarly, source node 106 may optionally transmit toward feature identifier function 104 an acknowledgement message 218 acknowledging the receipt of the acknowledgement message 216.

After receiving the feature data set 214, destination node 108 starts training an ML model ("Model_1") using the feature data set 214 (e.g., the feature data set for Feature_1) (see step s220). After completing training the ML model, destination node 108 may transmit toward knowledge function 112 information 224 regarding the trained ML model. Also destination node 108 may transmit toward feature identifier function 104 a result 226 of the ML model training. The result 226 may include information regarding the importance of the selected feature (e.g., Feature_1).

After receiving the result 226, feature identifier function 104 may transmit toward source node 106 a request 228 for another feature data set (e.g., the feature data set for Feature 2). In response to receiving the request 228, source node 106 transmits toward destination node 108 the requested feature data set 230. After receiving the feature data set 230, destination node 108 may optionally transmit toward source node 106 an acknowledgement message 232 acknowledging the receipt. Similarly, source node 106 may optionally transmit toward feature identifier function 104 an acknowledgement message 234 acknowledging the receipt of the acknowledgement message 232.

After receiving the feature data set 230, destination node 108 starts training a ML model (e.g., Model_2) using the feature data set 230 or using both feature data sets 214 and feature data set 230 (see step s236). After completing training the ML model, destination node 108 transmits toward knowledge function 112 information 240 regarding the trained ML model. Also destination node 108 may transmit toward feature identifier function 104 a result 242 of ML model training. The result 242 may include information regarding the importance of Feature 2.

As illustrated in the message flow 200, the feature data set for the highest priority feature (e.g., Feature_1) is provided to destination node 108 first, and a respective ML model is trained using this feature data set and then the model is deployed so that it can be used to make inferences. In this way, model training can occur more quickly and efficiently because only a subset of the input data set (e.g., the feature data set associated with the highest priority feature) is used to train the ML model.

Figure 3:
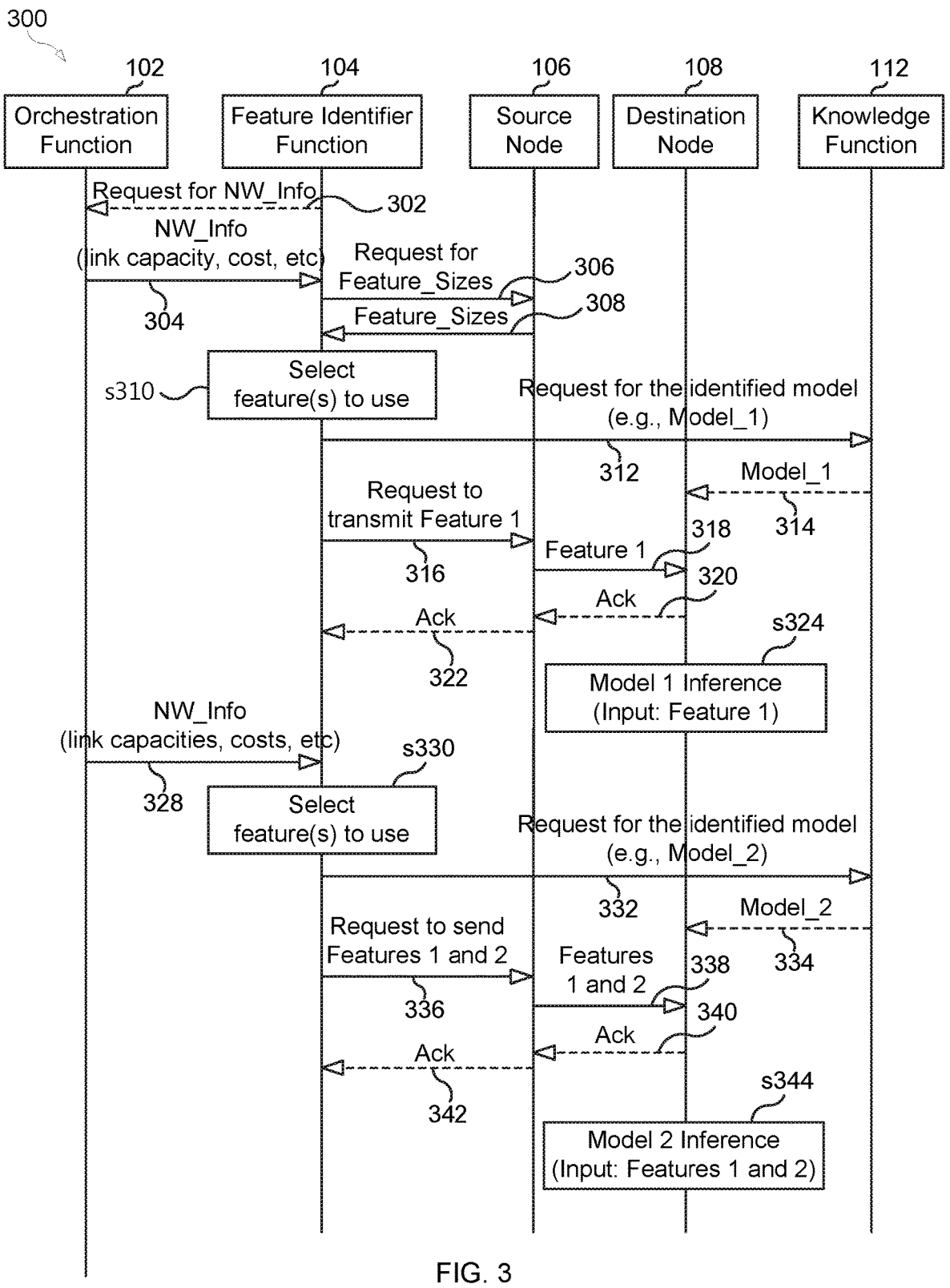
FIG. 3 is a process according to some embodiments.

FIG. 3 illustrates an exemplary message flow 300 for optimizing transmission of data (e.g., features) used for ML model inference. In the message flow 300, orchestration function 102 may transmit toward feature identifier function 104 network information ("NW_Info") 304. Examples of the network information 304 are network capacity and/or network transmission cost.

The network information 304 may be transmitted toward feature identifier function 104 based on an occurrence of an event. For example, the network information 304 may be transmitted toward feature identifier function 104 as a result of orchestration function 102 receiving from feature identifier function 104 a request 302 for the network information 304.

Feature identifier function 104 may transmit toward source node 106 a request 306 for information regarding the sizes of the feature data sets ("Feature_Sizes"). In response to the request 306, source node 106 transmits toward feature identifier function 104 the requested size information 308 ("Feature_Sizes").

Based on at least one of: the received network information 304, the received size information 308, and feature importance values, feature identifier function 104 selects (see step s310) at least one feature to use for making an inference. For example, for each feature included in a set of features, feature identifier function 104 may obtain a priority value indicating a priority of the feature, which priority value may be based on a cost of providing the feature data set associated with the feature from source node 106 to destination node 108 and a feature importance value that indicates the importance of the feature. That is, the priority value may be calculated using the received network information 304, the received size information 308 (i.e., the amount of data contained in the feature data set for the feature), and feature importance value. For example, the priority value of a particular feature may be proportional to $$\frac{\text{Feature importance value}}{\text{Size} \times \text{Transmission cost}} \text{ or}$$

$$\frac{\text{Feature importance value} \times \text{Network capacity}}{\text{Size}}.$$

Based on the obtained priority values, feature identifier function 104 selects at least one feature (e.g., Feature_1).

After selecting the feature, feature identifier function 104 transmits toward knowledge function 112 a request 312 comprising information identifying at least one of the features selected in step s310 and requesting that knowledge function 112 transmit to destination node 106 the ML model associated with the identified feature (e.g., the ML model that was created based on the training process that used only the feature data set for the identified feature). In case destination node 108 does not already have the ML model associated with the selected feature, then in response to receiving the request 312, knowledge function 112 transmits information 314 regarding the requested ML model to destination node 108.

Feature identifier function 104 also transmits toward source node 106 a request 316 comprising information identifying at least one feature (e.g., Feature 1) selected in step s310 and requesting that source node 106 transmit to destination node 106 the feature data set(s) for the identified feature(s). As a result of receiving the request 316, source node 106 transmits toward destination node 108 the requested feature data sets (e.g. the feature data set for Feature 1 as shown in FIG. 3). After receiving the data sets 318 for the identified feature(s), destination node 108 may optionally transmit toward source node 106 an acknowledgement message 320 acknowledging the receipt of the data sets 318. Similarly, source node 106 may optionally transmit toward feature identifier function 104 an acknowledgement message 322 acknowledging the receipt of the acknowledgement message 320.

In step s324, destination node 108 generates an inference using the feature data sets received from source node 106 and the corresponding model.

As shown in FIG. 3, feature identifier function 104 may receive further network information 328. The further network information 328 may include updated network capacity and updated network transmission cost information. After receiving the further network information 328, in step s330 feature identifier function 104 selects at least one feature (e.g., Feature 2) that was not selected in step s310. After performing step s330, feature identifier function 104 transmits toward knowledge function 112 a request 332 comprising information identifying at least one of the features selected in step s330 and requesting that knowledge function 112 transmit to destination node 106 the ML model associated with the identified feature. In case destination node 108 does not already have the ML model, then in response to receiving the request 332, knowledge function 112 transmits information 334 regarding the requested ML model to destination node 108.

Feature identifier function 104 also transmits toward source node 106 a request 336 comprising information identifying at least one features selected in step s330 and requesting that source node 106 transmit to destination node 106 the feature data set(s) for the identified feature(s). As a result of receiving the request 336, source node 106 transmits toward destination node 108 the requested feature data sets 338 (e.g. the feature data set for Feature 2 as well as a feature data set for feature 1 as shown in FIG. 3). After receiving the data sets 338, destination node 108 may optionally transmit toward source node 106 an acknowledgement message 340 acknowledging the receipt of the data. Similarly, source node 106 may optionally transmit toward feature identifier function 104 an acknowledgement message 342 acknowledging the receipt of the acknowledgement message 320.

In step s344, destination node 108 generates an inference using the feature data sets 338 received from source node 106 and the model corresponding to these feature data sets.

FIG. 4 is a flow chart illustrating a process 400 according to some embodiments. Process 400 may be performed by a feature identifier for selecting at least one feature from a set of features comprising a first feature and a second feature. Each feature included in the set of features may be associated with a data set for the feature such that the first feature is associated with a first data set and the second feature is associated with a second data set. Process 400 may begin in step s402.

Step s402 comprises, for each feature included in the set of features, obtaining a value indicating a cost of providing the data set for the feature from a source node that stores the data set to the destination node that is connected to the source node via a network.

Step s404 comprises, based on the obtained values, selecting a subset of the set of features.

Step s406 comprises, for each selected feature, initiating the transmission of the respective data set for the respective selected feature from the source node that stores the respective data set for the respective selected feature to the destination node via the network that connects the destination node with the source node that stores the respective data set for the respective selected feature. The destination node may execute a machine learning process that is operable to use the respective data sets to produce a model. Alternatively or additionally, the destination node may execute a model generated by a machine learning process, and the model is operable to use the respective data sets to produce an inference.

In some embodiments, the step of obtaining the value for each feature included in the set of features comprises obtaining a first value for the first feature, and the first value is a function of size of the first data set.

In some embodiments, the method further comprises obtaining network performance information for the network that connects the destination node with the source node that stores the first data set, and the first value is also a function of network performance information.

In some embodiments, the method further comprises obtaining a feature importance value for the first feature, and the first value is also a function of the feature importance value for the first feature.

In some embodiments, the first value is inversely proportional to the feature importance value (e.g., a higher feature importance value leads to a lower value).

In some embodiments, the subset of features includes the first feature but not the second feature, and the method further comprises after initiating the transmission of the data sets for the selected features, receiving from the destination node a model training result pertaining to a training of a model using the first data set; and after receiving the model training result, initiating the transmission of the second data set from the source node that stores the second data set to the destination node.

In some embodiments, the model training result comprises a first feature importance value for the first feature, the first feature importance value indicating the first feature's impact on the performance of the model.

Figure 5:
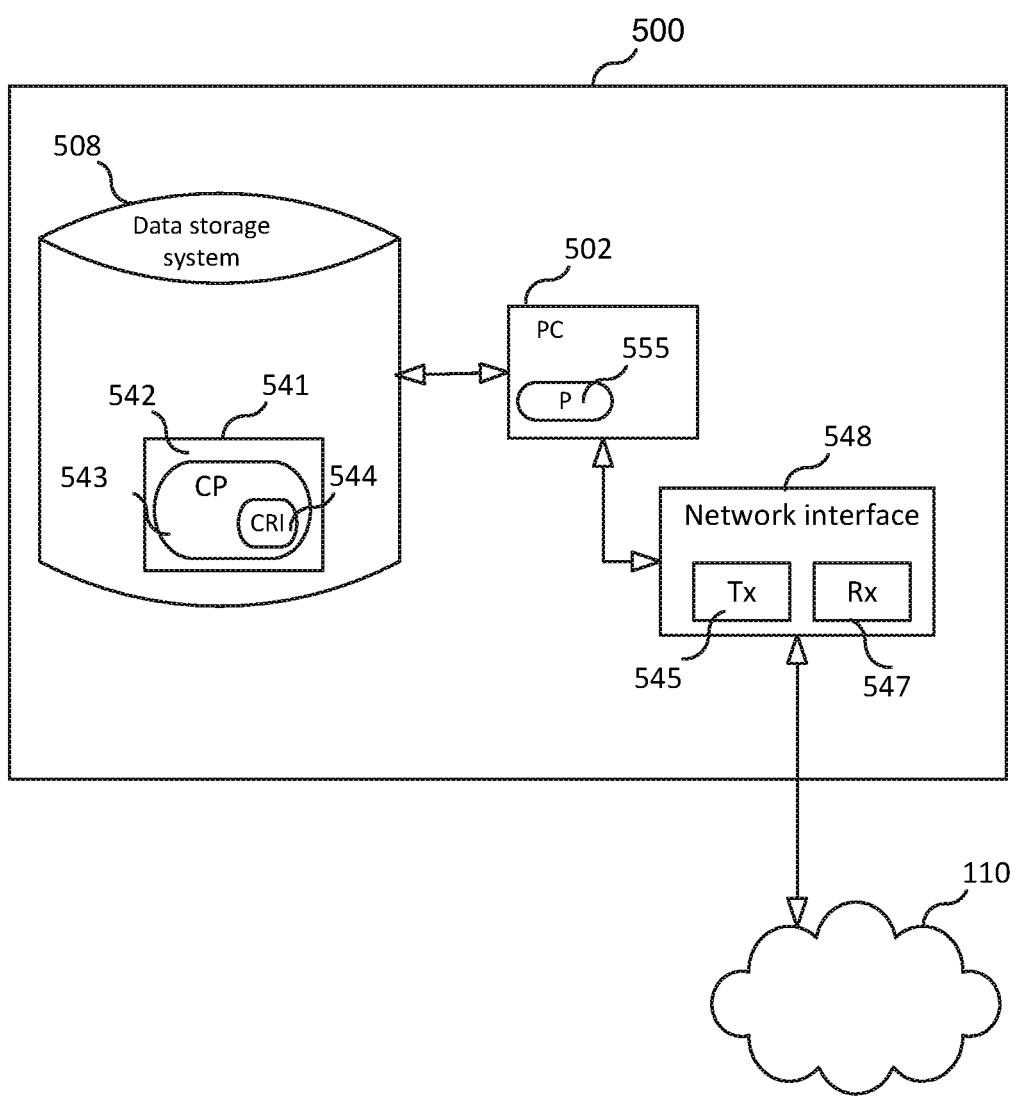
FIG. 5 is a block diagram illustrating an apparatus according to some embodiments.

FIG. 5 is a block diagram of an apparatus 500, according to some embodiments, for implementing any of orchestration function 102, feature identifier function 104, source node 106, destination node 108, and knowledge function 112. As shown in FIG. 5, apparatus 500 may comprise: processing circuitry (PC) 502, which may include one or more processors (P) 555 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 500 may be a distributed computing apparatus); a network interface 548 comprising a transmitter (Tx) 545 and a receiver (Rx) 547 for enabling apparatus 500 to transmit data to and receive data from other nodes connected to a network 110 (e.g., an Internet Protocol (IP) network) to which network interface 548 is connected (directly or indirectly) (e.g., network interface 548 may be wirelessly connected to the network 110, in which case network interface 548 is connected to an antenna arrangement); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes apparatus 500 to perform steps described herein (e.g., steps described herein with reference to the flow charts). In other embodiments, apparatus 500 may be configured to perform steps described herein without the need for code. That is, for example, PC 502 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing data to a destination node connected to one or more source nodes via one or more networks, the method being performed by a feature identifier for selecting at least one feature from a set of features, the set of features comprising a first feature and a second feature, wherein each feature included in the set of features is associated with a data set such that the first feature is associated with a first data set and the second feature is associated with a second data set, the first data set associated with the first feature comprises values for the first feature, the second data set associated with the second feature comprises values for the second feature, and the method comprises:

for each feature included in the set of features, obtaining a cost value for the feature, the cost value indicating a cost of providing the data set associated with the feature from a source node that stores the data set to the destination node that is connected to the source node via a network;

for each feature included in the set of features, obtaining an importance value indicating an importance of the feature;

for each feature included in the set of features, calculating a priority value using the importance value for the feature and the cost value for the feature;

based on the calculated priority values, selecting a subset of the set of features; and for each selected feature, initiating the transmission of the respective data set associated with the respective selected feature from the source node that stores the respective data set associated with the respective selected feature to the destination node via the network that connects the destination node with the source node that stores the respective data set associated with the respective selected feature, wherein the destination node is configured to execute a machine learning process that is operable to use the respective data sets to produce a model, and/or the destination node is configured to execute a model generated by a machine learning process, and the model is operable to use the respective data sets to produce an inference.

2. The method of claim 1, wherein the step of obtaining the cost value for each feature included in the set of features comprises obtaining a first cost value for the first feature, and the first cost value is a function of size of the first data set.

3. The method of claim 2, wherein the method further comprises obtaining network performance information for the network that connects the destination node with the source node that stores the first data set associated with the first feature, and the first cost value is also the function of network performance information.

4. The method of claim 1, wherein the first cost value is inversely proportional to the feature importance value.

5. The method of claim 1, wherein the subset of features includes the first feature but not the second feature, and the method further comprises:

after initiating the transmission of the data sets for the selected features, receiving from the destination node a model training result pertaining to a training of a model using the first data set associated with the first feature; and after receiving the model training result, initiating the transmission of the second data set associated with the second feature from the source node that stores the second data set associated with the second feature to the destination node.

6. The method of claim 5, wherein the model training result comprises a first feature importance value for the first feature, the first feature importance value indicating the first feature's impact on the performance of the model.

7. A non-transitory computer readable storage medium storing a computer program comprising instructions which when executed by processing circuitry causes the processing circuitry to perform the method of claim 1.

8. An apparatus for providing data to a destination node connected to one or more source nodes via one or more networks and for selecting at least one feature from a set of features, the set of features comprising a first feature and a second feature, wherein each feature included in the set of features is associated with a data set such that the first feature is associated with a first data and the second feature is associated with a second data set, the first data set comprises values for the first feature, the second data comprises values for the second feature, and the apparatus including:

a memory; and processing circuitry, wherein the apparatus is configured to:

for each feature included in the set of features, obtain a cost value for the feature, the cost value indicating a cost of providing the data set associated with the feature from a source node that stores the data set to the destination node that is connected to the source node via a network;

for each feature included in the set of features, obtain an importance value indicating an importance of the feature;

for each feature included in the set of features, calculate a priority value using the importance value for the feature and the cost value for the feature;

based on the calculated priority values, select a subset of the set of features; and for each selected feature, initiate the transmission of the respective data set associated with the respective selected feature from the source node that stores the respective data set associated with the respective selected feature to the destination node via the network that connects the destination node with the source node that stores the respective data set associated with the respective selected feature, wherein the destination node is configured to:

execute a machine learning process that is operable to use the respective data sets to produce a model, and/or execute a model generated by a machine learning process, and the model is operable to use the respective data sets to produce an inference.

9. The apparatus of claim 8, wherein the apparatus is further configured to obtain the value for each feature included in the set of features by performing a process that includes obtaining a first cost value for the first feature, and the first cost value is a function of size of the first data set.

10. The apparatus of claim 8, wherein the apparatus is further configured to obtain network performance information for the network that connects the destination node with the source node that stores the first data set associated with the first feature, and the first cost value is also a function of network performance information.

11. The apparatus of claim 8, wherein the first cost value is inversely proportional to the feature importance value.

12. The apparatus of claim 8, wherein the subset of features includes the first feature but not the second feature, and the apparatus is further configured to:

after initiating the transmission of the data sets for the selected features, receive from the destination node a model training result pertaining to a training of a model using the first data set associated with the first feature; and after receiving the model training result, initiate the transmission of the second data set associated with the second feature from the source node that stores the second data set associated with the second feature to the destination node.

13. The apparatus of claim 12, wherein the model training result comprises a first feature importance value for the first feature, the first feature importance value indicating the first feature's impact on the performance of the model.

* * * * *